United States Patent [19]

Lipe et al.

[11] 3,786,498
[45] Jan. 15, 1974

[54] AUDIO-VISUAL WARNING SYSTEM

[76] Inventors: Gordon C. Lipe, West Lake Rd.; William S. Abbott, 20 Lakeview Circle, both of Skaneateles, N.Y. 13152

[22] Filed: Dec. 2, 1971

[21] Appl. No.: 204,125

[52] U.S. Cl.................. 340/371, 340/326, 340/75
[51] Int. Cl. .............................................. G08b 7/00
[58] Field of Search............... 340/371, 75, 76, 340/88, 326, 327

[56] References Cited
UNITED STATES PATENTS

| | | | |
|---|---|---|---|
| 2,912,685 | 11/1959 | Thomas | 340/326 |
| 3,648,273 | 3/1972 | Gardner | 340/326 |
| 2,671,212 | 3/1954 | Mingle | 340/75 X |
| 3,559,165 | 1/1971 | Kleeman | 340/76 X |
| 2,734,181 | 2/1956 | Warner | 340/75 |
| 2,696,598 | 12/1954 | Lozowski | 340/75 |
| 3,436,728 | 4/1969 | Silverwood et al. | 340/75 |

*Primary Examiner*—John W. Caldwell
*Assistant Examiner*—William M. Wannisky
*Attorney*—Bruns & Jenney

[57] ABSTRACT

An audio-visual warning system for mechanized vehicles which is activated by a single act of the vehicle's operator. This is accomplished by connecting an audio warning element, such as a horn, and a visual warning element, such as a light, in parallel with a horn button and a power supply. Thus when the horn button is depressed the circuit is closed and both an audible sound and visible light are emitted to warn approaching traffic and pedestrians of an impending danger.

2 Claims, 7 Drawing Figures

INVENTORS
GORDON C. LIPE &
WILLIAM S. ABBOTT

BY Bruns & Jenney

ATTORNEYS

INVENTORS.
GORDON C. LIPE &
WILLIAM S. ABBOTT

BY Bruns & Jenney

ATTORNEYS

AUDIO-VISUAL WARNING SYSTEM

BACKGROUND OF THE INVENTION

This invention relates to an electrical audio-visual warning system which is particularly useful on mechanized vehicles.

Mechanized commercial and domestic vehicles such as automobiles, boats, airplanes, forklifts, snowmobiles and the like frequently use audible means such as horns to warn others of impending dangers. Most notable of these is the automobile horn which is used to warn pedestrians as well as vehicular traffic.

Unfortunately, the audible warning is oftentimes either received too late or can't be heard at all. The latter may happen, for example, because the windows of the automobile or truck being warned are closed; because the engine, air-conditioning, radio, stereo, or passengers are distracting the driver; or because the driver's hearing is impaired due to the disability or general noise pollution. The end result of the failure to hear such a warning may be personal injury or even death.

In order to overcome these problems and to ensure maximum protection to operators and passengers of mechanized vehicles, as well as to pedestrians, there is a definite need to have an essentially simultaneous audio-visual warning system on each vehicle to notify others of possible danger.

SUMMARY OF THE INVENTION

This invention comtemplates an electrical audio-visual warning system to be mounted on mechanized vehicles so that other vehicles or pedestrians can be given a dual warning of an impending danger. The basic warning system comprises a power supply, an activating horn switch or button, a relay, an audible warning element such as a horn, and a visual warning element such as a light mounted on the vehicle such that it can be easily seen by oncoming traffic.

Thus, when the operator of the vehicle wants to warn others of an impending danger he activates the system by pushing the horn button or other switch which closes the circuit and energizes the horn causing it to give off an audible sound. Simultaneously, the button activates the light, directly or indirectly.

Since light travels at a speed of 186,000 miles per second compared to sound's speed of only 1,000 feet per second, it can give others a quicker notification of possible danger. This advantageous result in particularly important when used by vehicles traveling at high speeds since it allows for a quicker response by those receiving the warning, even if the horn is subsequently heard. In this connection, it was found by actual test that in a number of instances under ideal conditions a horn could not be heard by the driver of the other vehicle and yet was so audible to the driver of the car using it that he tended to avoid using it again or decreased the length of the blast. It is believed that the visual supplyment to the audible horn will also help pedestrians by alerting them more readily as to direction, source and distance. Likewise, the visual supplement should reduce the number of "head on" collisions that occur at dusk when a driver's vision may be impaired due to its physical adjustment to darkness.

Additional advantages of the present invention are that both the audio and visual warnings are activated by a single action of the operator; the system is of simple design and relatively inexpensive to manufacture; it can be easily adapted to existing vehicles without extensive modification; and it has great versatility in that it can be used on commercial and domestic vehicles whether used on land, water, or in the air. Furthermore, the relay can be modified to continue giving the visual warning even though the sound is no longer audible. It also serves as a "back up" to the audible horn in the event of its failure.

It will, of course, be recognized that due to existing visual warning systems on automobile, police cars, ambulances, voluteer fireman's cars and the like, the visual warning would have to comply with all existing governmental laws and regulations. This could be done, for example, by varying the color of the light used, its location on the vehicle, or the manner in which the light is transmitted (e.g., flashing, uninterrupted, or by varying its intensity). Furthermore, the visual warning may consist of one or more lights located on a vehicle.

It is further comtemplated that this dual warning system may be installed on original equipment or sold in kits for subsequent installation on new or used equipment.

DESCRIPTION OF THE PREFERRED EMBODIMENTS

Figure 1:
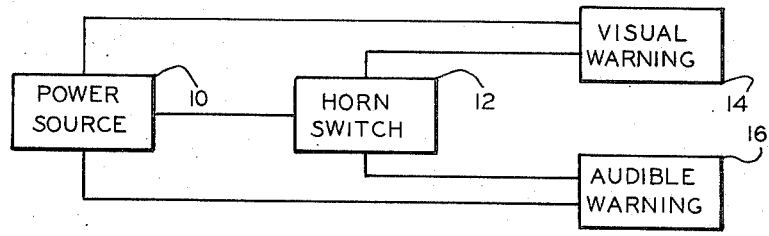
FIG. 1 is a block diagram of one embodiment of a dual warning system constructed according to the present invention.

To facilitate an understanding of the details of circuits constructed according to the present invention, the operation of one such circuit will first be explained, with particular reference to FIGS. 1 and 2. In FIG. 1 there is shown a block diagram comprising a power supply 10, a horn switch 12, a light warning element 14 and an audible warning element 16. The circuit is activated by closing the horn switch which simultaneously completes the circuit between the power supply and the light audible warning elements thereby causing both a visual and audible warning to be emitted.

Figure 2:
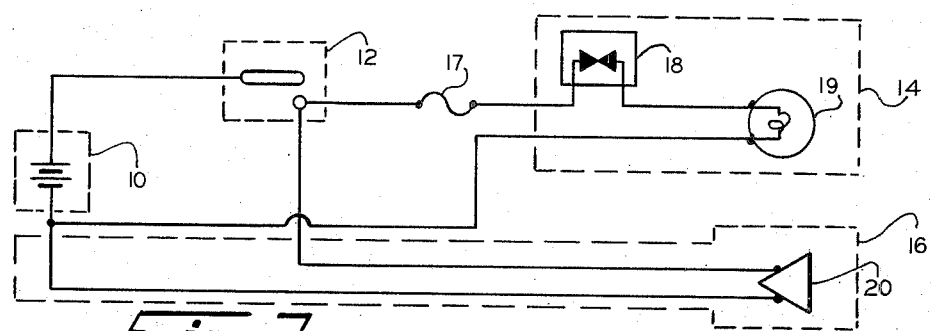
FIG. 2 is a schematic diagram of the dual warning system shown in FIG. 1.

FIG. 2 shows a more detailed schematic diagram of the circut of FIG. 1. Typically, the power supply 10 comprises a battery which is the energy source of the system. A horn switch 12, such as a horn button, has one of its terminals connected to a terminal of the battery. The other terminal of the horn switch is connected to one side of the visual warning element 14 and also to a side of the audible warning elements 16, such as a horn 20. The other sides of the warning elements 14 and 16 are connected to the other terminal of the power supply. The visual warning element 14 includes a fuse 17, a flasher 18 and a light 19 connected in series. Preferably, the flasher operates at about 120 flashes per minute to distinguish it from turn signals which flash at about 60 flashes per minute. It will, of course, be recognized that the number of flashes per minute can be varied to meet statutory requirements.

In addition, the flasher may be removed altogether if a nonflashing light is desired. The fuse 17 may also be eliminated if there is no danger of overloading the circuit, or in the event that the horn circuit has a fush that can shared. The circuit is "broken" or opened when the horn switch is turned off. In the case of the horn button this occurs when the button is not being manually depressed. It will, of course, be recognized that if the equipment on which this circuit is used has a positive ground, the polarities of the above components and the circuitry may be modified to accommodate this condition without deviating from the essence of the present invention.

The major advantage of circuit of FIG. 1 is that the single act of depressing the horn button simultaneously activates both the visual and audible warnings. In some situations, however, it may be desirable to continue the flashing or steady visual warning even after the horn button is released and the audible warning has been heard and discontinued. For example, in a noisy factory the horn on a forklift might not be heard but the light can be seen. In addition, it may be desirable to continue the visual warning for a predetermined period of time after the horn button is released. FIGS. 3–7 depict a number of modifications of the basic circuit shown in FIGS. 1 and 2 to accomplish these additional features.

Figure 3:
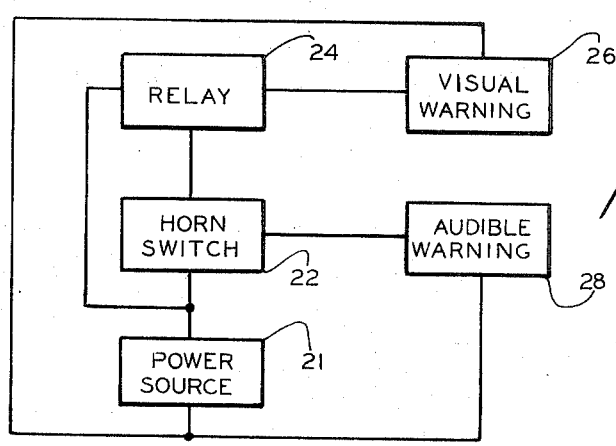
FIG. 3 is a block diagram of another embodiment of the dual warning system of the invention, including a relay.

FIG. 3 is a block diagram of the circuits shown in FIGS. 4–7, and comprises a power supply 21, a horn switch 22, a relay sub-assembly 24, a visual warning element 26 and an audible warning element 28. The only difference between the operation of these circuits and that of FIG. 1 is that the horn switch when it is depressed or turned on activates the relay which in turn activates the visual warning element 26. Otherwise the operation of the circuits shown in FIGS. 1 and 3 are the same.

Figure 4:
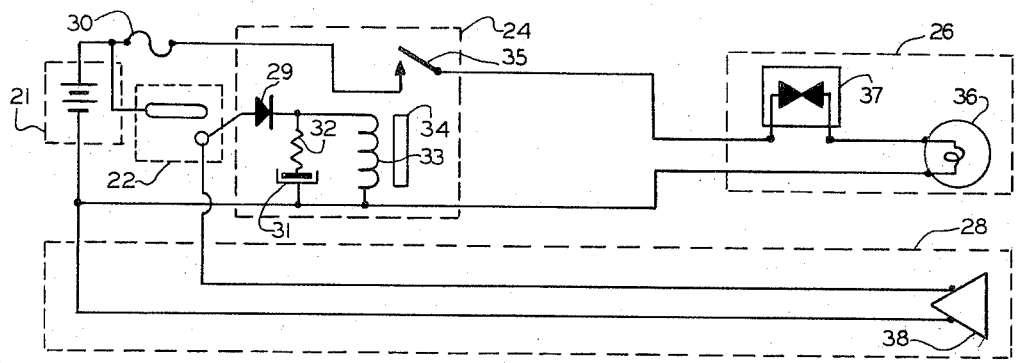
FIG. 4 is a schematic diagram of one form of the dual warning system shown in FIG. 3.
Figure 5:
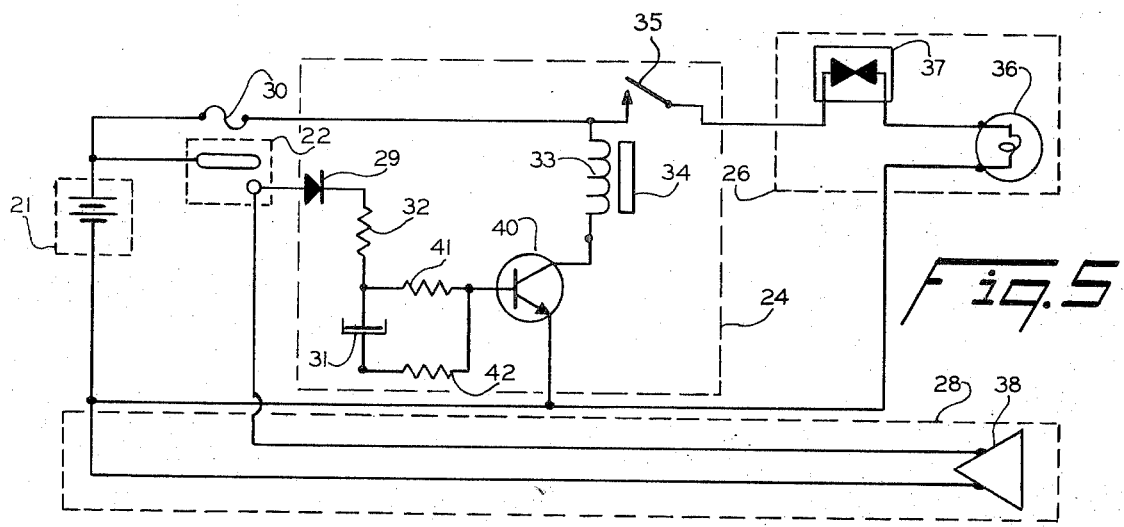
Figure 6:
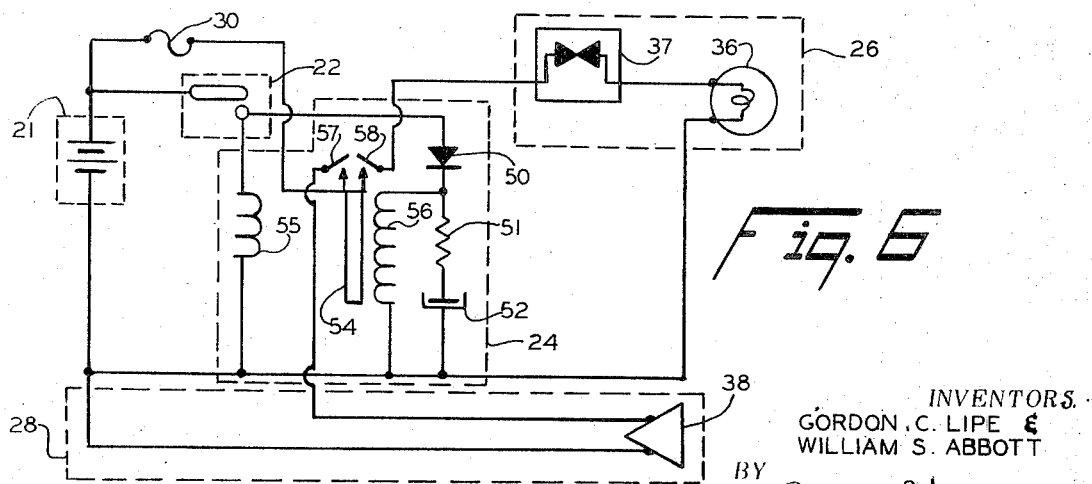

Of the circuits shown in FIGS. 4–6, the circuit shown in FIG. 4 is preferred because of its ease of manufacture, low cost, and simplicity of design which allows it to be easily incorporated in existing vehicles. Since the functions and operations of the power supply 21, horn switch 22, and audible warning element 28 are the same as those shown in FIGS. 1 and 2 they will not be described in detail. The relay subassembly 24 comprises a diode 29, a fuse 30, a capacitor 31, a resistor 32 and a magnetic relay 34 having a coil 33. The diode 29, capacitor 31 and the resistor 32 are connected in series to one terminal of the horn switch 22. The diode is selected to allow sufficient forward flow of voltage and current to charge the capacitor. The capacitor 31 which is connected in parallel with the coil 33 of the relay 34 has an R.C. characteristic such that it can hold the relay closed for a predetermined time interval when the relay is energized. The resistor 32 is used to reduce arcing of the hown switch and helps to control the discharge of the capacitor.

When the horn switch is activated, the horn blows and a positive pulse flows through the diode and charges the capacitor which subsequently energizes the relay. This closes the circuit at 35 and produces a visual warning by activating element 26. Fuse 30 is used to protect the circuit from an overload and may be eliminated, if desired. Although the characteristics of the diode, capacitor and magnetic relay can be varied to produce a number of different lighting effects, typically the circuit in FIG. 4 has the following values:

The power supply 21 is a 12 volt battery. Diode 29 is a two terminal silicon rectifier 1N4001 which is commercially available from Motorola Inc. of Phoenix, Ariz. Capacitor 31 is rated at 16 volts and 2,500 microfarads. The resistor 32 is rated at 10 ohms. Fuse 30 is rated at 6 amperes. Relay 33 is relay A282721 which is commerically available from Frederick Controls Division of Philips Corp. located in Frederick, Md. and has a 12V DC coil with 1,760 ohms resistance. The horn switch 22 is typically the horn button located on the steering wheel of the vehicle. The visual warning element 26 comprises a 2.5 ampere, 35 watt amber color bulb 36 and a flasher 37 such as flasher 9104 which is normally closed, has three terminals, is indirectly heated, and is commerically available from Ideal Corp. of Brooklyn, N.Y. The audible warning element 28 is an automobile horn 38 which normally draws about 15 amperes of current.

FIG. 5 shows a further modification of the relay subassembly 24 of FIG. 3 in which an NPN transistor 40 and two resistors 41 and 42 are added to diode 29, resistor 32, magnetic relay 33 and capacitor 31 to control the discharge of the capacitor. This is accomplished by connecting the resistors 41 and 42 in parallel across the capacitor 31 such that one terminal of each is connected to the base of the transistor 40. The collector of the transistor is connected to the relay coil 33 and its emitter to the power supply. The main advantage of this configuration is that resistors 41 and 42 provide better control of the discharge characteristic of the capacitor when the circuit is closed than the circuit shown in FIG. 4.

With reference to FIG. 6, there is shown another modification of the relay subassembly 24 of FIG. 3 wherein the circuit includes a diode 50, resistor 51, capacitor 52, and a special relay. The relay has a single core 54, a low ohmage horn coil 55 and a high ohmage light coil 56 which coils activate relay contacts 57 and 58, respectively. Diode 50, resistor 51 and capacitor 52 are connected in series and series the same purpose as their counterparts 29, 32 and 31, respectively, in FIGS. 4 and 5. A positive pulse from the horn button 22 closes both pairs of relay contacts 57 and 58.

The low ohmage coil 55 rapidly pulls in both the horn relay contact 57 and the light relay contact 58. The horn contact 57 releases when the horn button 22 is no longer closed. The high ohmage coil 56, however, which is in parallel with the resistor 51 and capacitor 52, is capable of holding the light relay contact 58 closed for a fixed interval after the horn button is released. This is possible because the discharge of the temporarily hold capacitor is only through the higher ohmage coil 56 of the relay, its energy being blocked from dissipation through the coil 55 by the diode 50. It is believed that this double coil common core magnetic relay is unique and has a number of potential applications not previously available with a single magnetic relay system.

Figure 7:
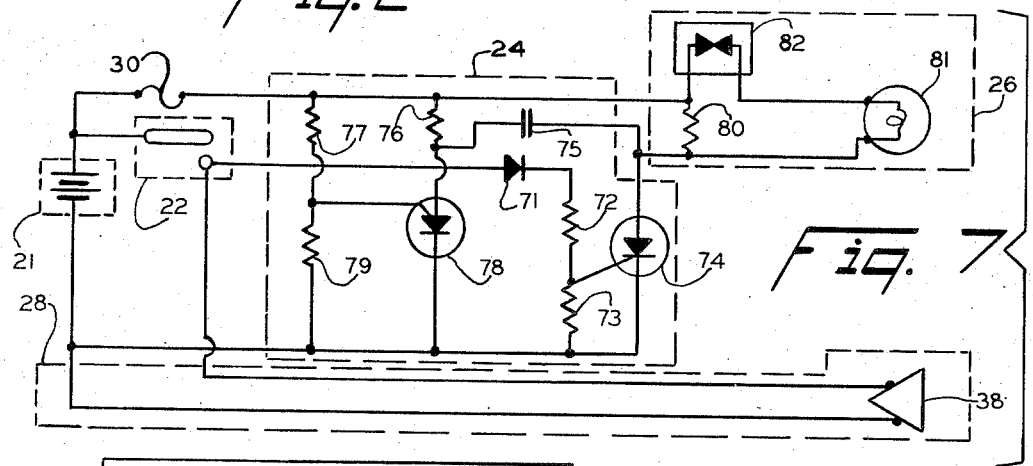
FIGS. 5, 6 and 7 are schematic diagrams of modified forms of the dual warning system shown in FIG. 3.

FIG. 7 discloses a still further modification of the relay subassembly 24 of FIG. 3 which includes a diode 71, resistors 72 and 73, a silicon controlled rectifier (SCR) 74, a non-polar capacitor 75, resistors 76 and 77, a programmable unijunction transistor (PUT) 78, and a resistor 79. The remaining elements in this circuit comprising the power supply 21, the horn switch 22, the visual and audible warning elements 26 and 28, respectively, and fuse 30 serve the same function as previously described for FIGS. 4–6. A resistor shunt 80, however, which has not been previously used is placed across a terminal of the light 81 and a terminal of the flasher 82 to ensure that the light once it is turned on will remain on for the desired time.

The main advantage of this relay subassembly over others already described is its ability to accurately and consistently maintain the visual warning system in the "on state" for the predetermined time. Furthermore, it can be automatically assembled as well as encapsulated in a single unit. This is accomplished by replacing the electro-mechanical relay with the SCR 74 and PUT 78.

The relay subassembly 24 is activated by closing the horn switch 22 which causes a positive pulse to flow through the diode 71. The pulse continues through resistors 72 and 73 which balance each other to ensure that the proper current to trigger the gate of the SCR 74 is supplied. Once the gate fires the SCR switches from the "off-state" to the "on-state" which charges up the capacitor 75 and then after a predetermined time triggers the PUT 78. When the voltage on the capacitor reaches a certain predetermined value it triggers and connects the capacitor inversely to the PUT which causes the circuit to drop out. Resistor 76 is connected between the anode of the PUT and a terminal of the flasher 82 to control the time it takes the capacitor to discharge, and thereby ensure that the PUT shuts off the SCR. Resistor 79 is connected between the gate and the cathode of the PUT. It will, of course, be recognized that resistor 80 can be eliminated if the flasher 82 is not needed.

Tests have indicated that although the predetermined "on" time of the light circuit can be varied by changing the values of the resistors, an "on" time of about 6 seconds is best. In order to obtain a circuit wherein the visual warning element remainded active for 6 seconds after the horn button was released, the following values for the various elements in FIG. 7 were needed.

The power supply 21 is a 12 volt battery. The diode 71 is a two terminal silicon rectifier IN4001 which is commercially available from Motorola Inc. Resistor 72 is rated at 100 ohms and resistor 73 at 1,000 ohms. The SCR 74 is a C106 SCR which is commerically available from General Electric Co. Capacitor 75 is a 16 volt, 40 microfarads, non-polar capacitor. Resistor 76 is rated at 32 K ohms and resistor 77 at 47 K ohms. The PUT 78 is a D13T programmable unijunction transistor which is commerically available from General Electric Co. Resistor 79 is rated at 220 Kohms.

The visual warning element 26 comprises a 2.5 ampere, 35 watt amber colored bulb 81; a three terminal, indirectly heated 9104 flasher 82 which is commerically available from Ideal Corp. of Brooklyn, N.Y.; and a resistor 80 rated at about 150 ohms. The horn switch 22 is typically a horn button. The audible warning element 28 is an automobile horn 38 which normally draws about 15 amperes of current.

In summary, the present invention contemplates a dual audio-visual warning system which produces an audio sound simultaneously with, or rapidly followed by, either a steady or a flashing light which may or may not stop after the audio sound ceases to be emitted.

We claim:

1. A mechanized vehicle electrical audio-visual warning system comprising:
   a. a power supply;
   b. first means for producing a visible light when connected to said power supply;
   c. second means for producing an audible sound when connected to said power supply;
   d. a normally open switch selectively closable by an operator to connect said second means directly to said power supply; and
   e. relay subassembly means comprising a diode, a first resistor, a second resistor, a third resistor, a fourth resistor, a fifth resistor, a non-polar capacitor, a silicon controlled rectifier and a programmable unijunction transistor, the anode of the diode being connected to one side of said switch, the first resistor being connected between the cathode of the diode and the gate of the silicon controlled rectifier, the second resistor being connected between the gate and cathode terminals of the silicon controlled rectifier, the capacitor being connected between the anode of the silicon controlled rectifier and the anode of the programmable unijunction transistor, the third resistor being connected between the gate and cathode terminals of the programmable unijunction transistor, the fourth resistor being connected between the gate of the programmable unijunction transistor and the negative side of the visible light producing means, the fifth resistor being connected between the anode of the programmable unijunction transistor and the positive side of the visible light producing means, the first and second resistors being balanced to allow sufficient current to trigger the gate of the silicon controlled rectifier when said switch is activated, the third and fourth resistors being balanced to allow sufficient current to trigger the gate of the programmable unijunction transistor, and the fifth resistor being operable to control the discharge rate of the capacitor.

2. A mechanized vehicle electrical audio-visual warning system comprising:
   a. a power supply;
   b. first means for producing a visible light when connected to said power supply;
   c. second means for producing an audible sound when connected to said power supply;
   d. a first normally open switch selectively closable by an operator to connect said second means directly to said power supply; and
   e. relay subassembly means including a relay coil and a second normally open switch which is closed to connect said first means to said power supply in response to energization of said coil, said coil being energized by said power supply in response to closure of said first switch, said relay subassembly means also including a diode, a resistor and a capacitor connected together in series in that order, the diode-resistor-capacitor series circuit being connected between one side of said first switch and one terminal of the power supply, the relay being connected across the resistor and capacitor in parallel therewith, said capacitor operating as a timing means effective to delay deenergization of said relay coil for a predetermined time after said first switch is opened, whereby said light remains illuminated for said predetermined time after said audible sound stops.

* * * * *